(12) United States Patent
Levine et al.

(10) Patent No.: US 10,035,970 B2
(45) Date of Patent: Jul. 31, 2018

(54) FRICTION-REDUCING COMPOUND, METHOD OF PRODUCING SAME, AND LUBRICANT COMPOSITION

(71) Applicant: BASF SE, Ludwigshafen am Rhein (DE)

(72) Inventors: Jeffrey Alan Levine, White Plains, NY (US); Si Wu, Ossining, NY (US); David E. Chasan, Teaneck, NJ (US); Philippe Rabbat, New York, NY (US); Ryan J. Fenton, Norwalk, CT (US); Glenn C. Phillips, Marboro, NY (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/590,509

(22) Filed: May 9, 2017

(65) Prior Publication Data

US 2017/0321147 A1 Nov. 9, 2017

Related U.S. Application Data

(60) Provisional application No. 62/333,489, filed on May 9, 2016.

(51) Int. Cl.
*C10M 169/04* (2006.01)
*C10M 173/00* (2006.01)
*C10M 129/08* (2006.01)

(52) U.S. Cl.
CPC ........ *C10M 169/04* (2013.01); *C10M 129/08* (2013.01); *C10M 173/00* (2013.01);
(Continued)

(58) Field of Classification Search
CPC ........... C09K 2208/28; C09K 2208/34; C10M 2201/02; C10N 2230/08
(Continued)

(56) References Cited

U.S. PATENT DOCUMENTS 3,189,646 A 6/1965 Rainer
3,281,452 A 10/1966 Kapar
(Continued)

FOREIGN PATENT DOCUMENTS

BE 643451 A 5/1964
CN 1392179 A 1/2003
(Continued)

OTHER PUBLICATIONS

English language abstract not found for BE 643451; however, see English language equivalent GB 1 057 742. Original document extracted from espacenet.com database on Jun. 12, 2017, 29 pages.
(Continued)

*Primary Examiner* — Vishal Vasisth
(74) *Attorney, Agent, or Firm* — Lowenstein Sandler LLP

(57) ABSTRACT

A lubricant composition for improving fuel economy of a vehicle having an internal combustion engine includes a base oil and a friction-reducing compound. The friction reducing compound has the following general formula:

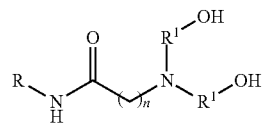

wherein R is an alkyl or alkenyl group having 8 or more carbon atoms, each $R^1$ is an independently selected hydrocarbon group having 2 to 10 carbon atoms, and n is 1.

20 Claims, 1 Drawing Sheet

(52) U.S. Cl.
CPC ...... *C09K 2208/28* (2013.01); *C09K 2208/34* (2013.01); *C10M 2201/02* (2013.01); *C10N 2230/08* (2013.01)

(58) Field of Classification Search
USPC ........................................................ 508/192
See application file for complete search history.

(56) References Cited

U.S. PATENT DOCUMENTS

| | | | |
|---|---|---|---|
| 3,326,974 | A | 6/1967 | Rainer |
| 3,645,953 | A | 2/1972 | Hindersinn et al. |
| 3,799,981 | A | 3/1974 | Thorpe et al. |
| 4,358,385 | A | 11/1982 | Zoleski et al. |
| 6,787,663 | B2 | 9/2004 | Adams et al. |
| 6,852,244 | B2 | 2/2005 | Egawa et al. |
| 2006/0058202 | A1 | 3/2006 | Levine et al. |
| 2006/0189490 | A1 | 8/2006 | Dardin et al. |
| 2007/0197407 | A1 | 8/2007 | Bardasz et al. |
| 2008/0076687 | A1 | 3/2008 | Habeeb et al. |

FOREIGN PATENT DOCUMENTS

| | | |
|---|---|---|
| CS | 269400 B1 | 4/1990 |
| EP | 0 007 182 A1 | 1/1980 |
| EP | 1 090 625 A2 | 4/2001 |
| EP | 1 698 726 A1 | 9/2006 |
| FR | 1 459 810 A | 6/1966 |
| GB | 808 874 | 2/1959 |
| GB | 1 057 742 | 2/1967 |
| JP | S 51-125144 A | 11/1976 |
| JP | S 52-146303 A | 12/1977 |
| JP | S 62-081462 A | 4/1987 |
| JP | H 04-209668 A | 7/1992 |
| JP | H 06-228868 A | 8/1994 |
| JP | H 06-228869 A | 8/1994 |
| JP | H 07-268773 A | 10/1995 |
| JP | H 08-113871 A | 5/1996 |
| JP | H 08-120565 A | 5/1996 |
| JP | H 08-337965 A | 12/1996 |
| JP | H 08-337971 A | 12/1996 |
| JP | H 10-183468 A | 7/1998 |
| JP | 2003-247168 A | 9/2003 |
| JP | 2003-300837 A | 10/2003 |
| JP | 2003-301373 A | 10/2003 |
| JP | 2005-154505 A | 6/2005 |
| JP | 2005-281953 A | 10/2005 |
| JP | 2006-124884 A | 5/2006 |
| JP | 2006-161215 A | 6/2006 |
| JP | 2006-161228 A | 6/2006 |
| WO | WO 98/27948 A1 | 7/1998 |
| WO | WO 98/27954 A1 | 7/1998 |
| WO | WO 98/33879 A1 | 8/1998 |
| WO | WO 01/00159 A1 | 1/2001 |
| WO | WO 01/00161 A1 | 1/2001 |
| WO | WO 01/00162 A1 | 1/2001 |
| WO | WO 01/00165 A1 | 1/2001 |
| WO | WO 01/00166 A1 | 1/2001 |
| WO | WO 01/00167 A1 | 1/2001 |
| WO | WO 01/07548 A1 | 2/2001 |
| WO | WO 01/46355 A1 | 6/2001 |
| WO | WO 01/75218 A1 | 10/2001 |
| WO | WO 01/85892 A1 | 11/2001 |
| WO | WO 02/10121 A1 | 2/2002 |
| WO | WO 02/32871 A2 | 4/2002 |

OTHER PUBLICATIONS

English language abstract and Machine-Assisted English language translation for CN 1392179 extracted from espacenet.com database on Jun. 14, 2017, 9 pages.

English language abstract for CS 269400 extracted from LexisNexis database on Jun. 12, 2017, 1 page.

English language abstract not found for FR 1 459 810; however, see English language equivalent U.S. Pat. No. 3,326,974. Original document extracted from espacenet.com database on Jun. 12, 2017, 4 pages.

English language abstract and Machine-Assisted English language translation for JPS 51-125144 extracted from espacenet.com database on Jun. 12, 2017, 11 pages.

Machine-Assisted English translation for JPS 52-146303 extracted from espacenet.com database on Jun. 12, 2017, 5 pages.

English language abstract and Machine-Assisted English language translation for JPS 62-081462 extracted from PAJ database on Jun. 12, 2017, 5 pages.

English language abstract and Machine-Assisted English language translation for JPH 04-209668 extracted from espacenet.com database on Jun. 12, 2017, 6 pages.

English language abstract and Machine-Assisted English language translation for JPH 06-228868 extracted from espacenet.com database on Jun. 14, 2017, 11 pages.

English language abstract and Machine-Assisted English language translation for JPH 06-228869 extracted from espacenet.com database on Jun. 14, 2017, 12 pages.

English language abstract and Machine-Assisted English language translation for JPH 07-268773 extracted from espacenet.com database on Jun. 14, 2017, 18 pages.

English language abstract and Machine-Assisted English language translation for JPH 08-113871 extracted from espacenet.com database on Jun. 14, 2017, 19 pages.

English language abstract and Machine-Assisted English language translation for JPH 08-120565 extracted from espacenet.com database on Jun. 14, 2017, 13 pages.

English language abstract and Machine-Assisted English language translation for JPH 08-337965 extracted from espacenet.com database on Jun. 14, 2017, 19 pages.

English language abstract and Machine-Assisted English language translation for JPH 08-337971 extracted from espacenet.com database on Jun. 12, 2017, 18 pages.

English language abstract and Machine-Assisted English language translation for JPH 10-183468 extracted from espacenet.com database on Jun. 12, 2017, 12 pages.

English language abstract and Machine-Assisted English language translation for JP 2003-247168 extracted from espacenet.com database on Jun. 12, 2017, 24 pages.

English language abstract and Machine-Assisted English language translation for JP 2003-300837 extracted from espacenet.com database on Jun. 12, 2017, 12 pages.

English language abstract and Machine-Assisted English language translation for JP 2003-301373 extracted from espacenet.com database on Jun. 12, 2017, 23 pages.

English language abstract and Machine-Assisted English language translation for JP 2005-154505 extracted from espacenet.com database on Jun. 12, 2017, 27 pages.

English language abstract and Machine-Assisted English language translation for JP 2005-281953 extracted from espacenet.com database on Jun. 12, 2017, 33 pages.

English language abstract and Machine-Assisted English language translation for JP 2006-124884 extracted from espacenet.com database on Jun. 12, 2017, 26 pages.

English language abstract and Machine-Assisted English language translation for JP 2006-161215 extracted from espacenet.com database on Jun. 12, 2017, 23 pages.

English language abstract and Machine-Assisted English language translation for JP 2006-161228 extracted from espacenet.com database on Jun. 12, 2017, 21 pages.

English language abstract for WO 01/75218 extracted from espacenet.com database on Jun. 12, 2017, 2 pages.

English language abstract and Machine-Assisted English language translation for WO 02/10121 extracted from espacenet.com database on Jun. 12, 2017, 27 pages.

Amorati, Riccardo et al., "TEMPO Reacts with Oxygen-Centered Radicals Under Acidic Conditions", Chem. Commun., vol. 46, 2010, pp. 5139-5141.

(56) References Cited

OTHER PUBLICATIONS

Chiotellis, E. et al., "99mTc-Labelled N-Substituted Carbamoyl Iminodiacetates: Relationship Between Structure and Biodistribution", International Journal of Nuclear Medicine and Biology, vol. 7, 1980, pp. 1-7.

Gerken, Birte M. et al., "Tweezin-Adsorptive Bubble Separation. Analytical Method for the Selective and High Enrichment of Metalloenzymes", Anal. Chem., vol. 77, 2005, pp. 6113-6117.

Abstract of Loberg, Michael D. et al., "Transport of Technetium-99m Complexes Through the Blood-Brain Barrier", Radiopharm. 2, Proc. Int. Symp., 2nd, 1979, 2 pages.

Smith, Douglas A. et al., "Facile Synthesis of Substituted Nitrilotriacetamides", Tetrahedron Letters, vol. 33, No. 50, 1992, pp. 7765-7768.

Suggs, J. William, "Facile Hydrolysis and Formation of Amide Bonds by N-Hydroxyethylation of a-Amino Acids", Tetrahedron Letters, vol. 38, No. 13, 1997, pp. 2227-2230.

Abstract of Sun, Meizhen et al., "Synthesis of New Chelating Agents, Polycarboxymethyliminoacetamides and Their Effectiveness for Removing Incorporated Cerium-141 From Body," Fushe Fanghu, vol. 10, No. 4, 1990, 1 page.

Valgimigli, Luca et al. "Maximizing the Reactivity of Phenolic and Aminic Radical-Trapping Antioxidants: Just Add Nitrogen!", Acc. Chem. Res. vol. 48, 2015, pp. 966-975.

FRICTION-REDUCING COMPOUND, METHOD OF PRODUCING SAME, AND LUBRICANT COMPOSITION

This application claims benefit of 62/333,489, filed May 09, 2016.

FIELD OF THE DISCLOSURE

The subject disclosure generally relates to a friction-reducing compound and, more particularly, to a method of producing a friction-reducing compound for a lubricant composition for an internal combustion engine of a vehicle.

BACKGROUND

Lubricant compositions are generally well known in the art and are broadly categorized as oil or water based compositions. Lubricant compositions are further typically categorized as engine oils, driveline system oils, gear oils, automatic and manual transmission fluids and oils, hydraulic oils, industrial gear oils, turbine oils, rust and oxidation (R&O) inhibited oils, compressor oils, or paper machine oils. Each of these compositions has particular specifications and design requirements. Regardless of categorization, these lubricant compositions are designed to minimize corrosion and wear, reduce friction, resist thermal and physical breakdown, and minimize the effects of common contaminants, such as oxidizing compounds and metal fragments.

Many attempts have been made to improve the performance of lubricant compositions by utilizing various compounds for reducing friction. Specifically, various friction-reducing compounds have been utilized in lubricant compositions to reduce friction within internal combustion engines of vehicles, which generally improves fuel economy of the vehicles.

BRIEF DESCRIPTION OF THE FIGURES

Other advantages of the present disclosure will be readily appreciated, as the same becomes better understood by reference to the following detailed description when considered in connection with the accompanying drawings wherein.

SUMMARY OF THE DISCLOSURE

Figure 1:
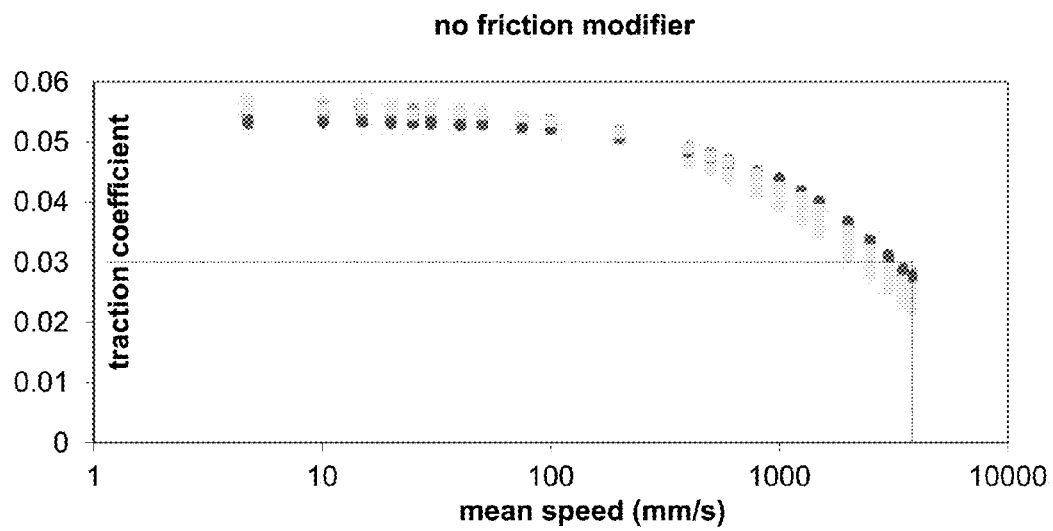
FIG. 1 is a graph that shows traction coefficient as a function of mean speed, as evaluated in the comparative Examples.

The subject disclosure provides a friction-reducing compound. The friction reducing compound has the following general formula:

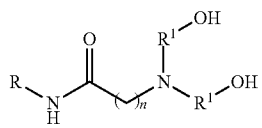

wherein R is an alkyl or alkenyl group having 8 or more carbon atoms, each $R^1$ is an independently selected hydrocarbon group having 2 to 10 carbon atoms, and n is 1.

The subject disclosure also provides a lubricant composition for improving fuel economy of a vehicle having an internal combustion engine. The lubricant composition includes a base oil and the friction-reducing compound.

Further, the subject disclosure provides a method of producing the friction reducing compound. The method includes the step of combining bicine and oleylamine in a solvent to produce the friction-reducing compound.

The friction-reducing compound tends to impart lubricant compositions with excellent physical properties, including friction-reducing properties, as compared to conventional lubricant compositions. Accordingly, when utilized in an internal combustion engine of a vehicle, lubricant compositions including the instant friction-reducing compound typically increase the fuel economy of the vehicle.

DETAILED DESCRIPTION

The present disclosure provides a friction-reducing compound and a lubricant composition including the friction-reducing compound. The present disclosure also provides a first and a second method of producing the friction-reducing compound. The friction-reducing compound is particularly suitable for improving fuel economy of a spark-ignited internal combustion engine of a vehicle. However, it is to be appreciated that the friction-reducing compound is not limited to such uses or applications. For example, the friction-reducing compound may be utilized in lubricant compositions for power equipment.

The friction reducing compound has the following general formula:

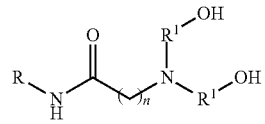

wherein R is an alkyl or alkenyl group having 8 or more carbon atoms, each $R^1$ is an independently selected hydrocarbon group having 2 to 10 carbon atoms, and n is 1. For example, R may be any linear, branched, or cyclic alkyl or alkenyl group having 8 or more carbon atoms, and any isomers thereof. In various embodiments, R is from 8 to 24, 10 to 22, 12 to 20, 14 to 18, 16 to 18, 8 to 14, 10 to 14, 12 to 14, 8 to 12, or 8 to 10. In a further embodiment, R is an alkyl or alkenyl group having 8 to 22 carbon atoms. In another embodiment, R is an oleyl group. In yet another embodiment, R has zero carbon-carbon double bonds. In still another embodiment, R has 1 carbon-carbon double bond. In a further embodiment, R has 2 carbon-carbon double bonds, that may be in any position.

Each $R^1$ may be the same or may be different from each other and each may have 2, 3, 4, 5, 6, 7, 8, 9, or 10, carbon atoms. In various embodiments, each $R^1$ is independently a divalent hydrocarbon group having from 1 to three 3 atoms, i.e., 1, 2, or 3 carbon atoms. Most typically, each $R^1$ is a divalent hydrocarbon group having two carbon atoms, i.e., a $CH_2CH_2$ group. In various non-limiting embodiments, all values and ranges of values including those set forth above and therebetween, are hereby expressly contemplated.

In one embodiment, one $R^1$ is $CH_2CH_2$ and the other $R^1$ is different. In another embodiment, each $R^1$ is $CH_2CH_2$. In a further embodiment, one $R^1$ is $CH(R^2)CH_2$, wherein $R^2$ is a hydrocarbon group having 1, 2, 3, 4, 5, 6, 7, or 8, or 1 to 8, carbon atoms, and wherein the other $R^1$ is different. In an even further embodiment, $R^2$ is an alkyl group having 1, 2, 3, 4, or 1 to 4, carbon atoms. In another embodiment, each $R^1$ is independently $CH(R^2)CH_2$ and wherein each $R^2$ is independently a hydrocarbon group having 1, 2, 3, 4, 5, 6, 7, or 8, or 1 to 8, carbon atoms. In another embodiment, $R^2$ is independently an alkyl group having 1, 2, 3, 4, or 1 to 4, atoms.

In various embodiments, a 2-hydroxyethyl embodiment is formed by reaction of glycine with ethylene oxide. Reaction with other alkylene oxides (e.g. propylene oxide) may provide analogous compounds such as $R^1$—$CH_2CH$ $(C_xH_{2x+1})OH$, wherein x is 1, 2, 3, 4, or 5. Relative to the group between the amine and carbonyl, the two-carbon analog may be stable or unstable (e.g. may be prone to retro-Michael additions) whereas 3, 4, or 5 carbon analogs may be more stable.

As introduced above, the present disclosure also provides a first method and a second method of producing the friction-reducing compound. The friction-reducing compound produced via the first and second methods corresponds to the friction-reducing compound above when each le is a divalent hydrocarbon group having two carbon atoms, i.e., a $CH_2CH_2$ group.

First Method:

The first method includes the step of combining oleylamine, sodium carbonate, and chloroacetyl chloride in a first solvent to form 2-chloro-N-oleylacetamide. For illustrative purposes only, the structure of oleylamine is set forth below:

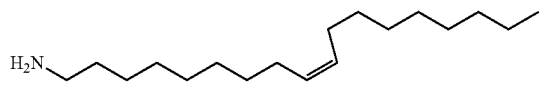 [SMILES: CCCCCCCC/C=C\CCCCCCCCN]

The first solvent may be any solvent suitable for the reaction to form 2-chloro-N-oleylacetamide. In certain embodiments, the first solvent includes an organic solvent. One example of an organic solvent suitable for the purposes of the first solvent is an ether solvent, e.g. diethyl ether. Generally, the first solvent is utilized in combination with water. The first solvent and the water may be utilized in various weight or volumetric ratios dependent upon the particular first solvent utilized. In various embodiments, the first solvent and water are utilized in a volumetric ratio of from 1:1 to 1:3, typically from 1:1.5 to 1:2.5, more typically 1:1.75 to 1:2.25. In various non-limiting embodiments, all values and ranges of values including those set forth above and therebetween, are hereby expressly contemplated.

In certain embodiments, the step of combining the oleylamine, sodium carbonate, and chloroacetyl chloride in the first solvent includes first combining the oleylamine, sodium carbonate, first solvent, and water (if present) to form a mixture. The mixture is typically continuously mixed and cooled to a temperature below ambient temperature. The reaction may be exothermic or endothermic or temperature neutral. The mixture may be continuously mixed by various methods of mixing, e.g. a mechanical stirrer, manual mixing, a mixing blade, etc. The temperature is typically from 5 to 25, alternatively from 10 to 22.5, alternatively from 15 to 20° C. In these embodiments, the step of combining the oleylamine, sodium carbonate, and chloroacetyl chloride in the first solvent further includes the step of combining the chloroacetyl chloride and the mixture. The step of combining the chloroacetyl chloride and the mixture may comprise disposing the chloroacetyl chloride in the mixture or disposing the mixture in the chloroacetyl chloride. Typically, the step of combining the chloroacetyl chloride and the mixture including disposing the chloroacetyl chloride in the mixture incrementally. For example, the chloroacetyl chloride may be added to the mixture dropwise while continuously stirring the mixture. In various non-limiting embodiments, all values and ranges of values including those set forth above and therebetween, are hereby expressly contemplated.

The chloroacetyl chloride is typically utilized in an amount of from 19.4 to 29.4, more typically from 21.4 to 27.4, most typically from 23.4 to 25.4 percent by weight based on the total weight of the reactants utilized to form the 2-chloro-N-oleylacetamide, excluding the weight of the solvent and water, if present. The oleylamine is typically utilized in an amount of from 48.5 to 58.5, more typically from 50.5 to 56.5, most typically from 52.5 to 54.5 percent by weight based on the total weight of the reactants utilized to form the 2-chloro-N-oleylacetamide, excluding the weight of the solvent and water, if present. The sodium carbonate is typically utilized in an amount of from 17.1 to 27.1, more typically from 19.1 to 25.1, most typically from 21.1 to 23.1 percent by weight based on the total weight of the reactants utilized to form the 2-chloro-N-oleylacetamide, excluding the weight of the solvent and water, if present. In various non-limiting embodiments, all values and ranges of values including those set forth above and therebetween, are hereby expressly contemplated.

Once the chloroacetyl chloride and the mixture are combined, the chloroacetyl chloride and the mixture are continuously stirred during the reaction to form the 2-chloro-N-oleylacetamide. Typically, the chloroacetyl chloride and the mixture are continuously stirred for a period of time of from 30 to 90, alternatively from 40 to 80, alternatively from 50 to 70, minutes after combining the chloroacetyl chloride and the mixture. To determine whether the oleylamine has fully reacted, a sample may be analyzed via spectroscopy, e.g. NMR. If amine groups are detected via NMR, additional chloroacetyl chloride may be added.

The reaction involving the oleylamine, sodium carbonate, and chloroacetyl chloride produces the 2-chloro-N-oleylacetamide in a solution. The first method typically further includes the step of isolating the 2-chloro-N-oleylacetamide from the organic phase. In certain embodiments, the step of isolating the 2-chloro-N-oleylacetamide includes combining the solution with an additional amount of the first solvent and water. Typically, the first solvent and water are utilized in a volumetric ratio of about 1:1 during the step of combining the solution and the additional amount of the first solvent and water. Typically, the additional amount of the first solvent is equivalent to the amount of the first solvent initially utilized when forming the mixture. It is to be appreciated that the additional amount of the first solvent and the water may vary from the amounts set forth above without departing from the scope of the present disclosure. Once the additional amount of the first solvent and the water are combined with the solution, an aqueous phase and an organic phase are formed. Generally, the first method further includes the step of removing the aqueous phase from the organic phase. The aqueous phase may be removed via decanting or other known methods for separating an aqueous phase from an organic phase. The 2-chloro-N-oleylacetamide remains in the organic phase. Accordingly, the aqueous phase may be discarded once removed.

In certain embodiments, the step of isolating the 2-chloro-N-oleylacetamide further includes washing the organic phase with water and a saturated sodium chloride solution. In these embodiments, the step of isolating the 2-chloro-N- oleylacetamide additionally includes drying a combination of the saturated sodium chloride and the organic phase over anhydrous sodium sulfate. Finally, in these embodiments, the step of isolating the 2-chloro-N-oleylacetamide includes removing the first solvent via, for example, a rotary evaporator. The 2-chloro-N-oleylacetamide often has a waxy appearance upon its isolation.

The first method further includes the step of combining the 2-chloro-N-oleylacetamide and diethanolamine to produce the friction-reducing compound.

In certain embodiments, the step of combining the 2-chloro-N-oleylacetamide and diethanolamine includes combining a second solvent, which is the same as or different from the first solvent, and an additional amount of sodium carbonate with the 2-chloro-N-oleylacetamide and diethanolamine.

The second solvent may be any solvent suitable for the reaction to form the friction-reducing compound from the 2-chloro-N-oleylacetamide and diethanolamine. In certain embodiments, the second solvent includes an organic solvent. The second solvent may be selected from, but is not limited to, polar solvents, alcohol solvents, hydrocarbon solvents, aromatic solvents, ether solvents, heterocyclic solvents, etc. One specific example of an organic solvent suitable for the purposes of the second solvent is isopropyl alcohol. Other examples of specific solvents suitable for the purposes of the second solvent include toluene or xylene, toluene or xylene in combination with dimethylacetamide, or dimethylacetamide.

Second Method:

As introduced above, the present disclosure also provides a second method of producing the friction-reducing compound. The second method includes the step of combining bicine and oleylamine in a solvent to produce the friction-reducing compound.

The solvent utilized during the step of combining bicine and oleylamine may be any solvent suitable for the reaction between bicine and oleylamine. Typically, the solvent has a boiling point temperature at atmospheric pressure of at least 110, more typically at least 120, most typically at least 130° C., as described in greater detail below. Once specific example of a solvent suitable for the purposes of the second method is xylene, which has a boiling point temperature at atmospheric pressure of about 140° C. Toluene may alternatively be used. In various embodiments, the rate limiting step is likely mass transfer of water out of the reaction. In such embodiments, so as long as there is sufficient reflux (e.g. with a water azeotrope) and water separation, the reaction may move forward. As such, solvent may or may not be necessary. It is contemplated that embodiments that are free of solvent may be utilized.

Because bicine and oleylamine react on a molar basis of 1:1, bicine and oleylamine are typically utilized in the second method in a molar ratio of from 0.9:1 to 1.1:1, more typically from 0.95:1 to 1.05:1, most typically from 0.98:1 to 1.02:1. Of course, it is to be appreciated that bicine and oleylamine may be utilized in amounts other than the molar ratios set forth above without departing from the scope of the present disclosure. However, as readily understood by one of skill in the art, if bicine or oleylamine is utilized in a molar excess relative to the other, the molar excess will remain unreacted, which is generally undesirable. In various non-limiting embodiments, all values and ranges of values including those set forth above and therebetween, are hereby expressly contemplated.

Typically, the bicine, oleylamine and the solvent are combined to form a mixture while continuously mixing. The mixture may be continuously mixed by various methods of mixing, e.g. a mechanical stirrer, manual mixing, a mixing blade, etc. The step of combining the bicine and oleylamine in the solvent typically includes disposing the bicine and the oleylamine in the solvent. In these embodiments, the bicine and oleylamine may be disposed in the solvent simultaneously, the bicine may be disposed in the solvent prior to the oleylamine, or the oleylamine may be disposed in the solvent prior to the bicine. The bicine and/or the oleylamine may be disposed in the solvent incrementally or may be disposed in the solvent in their respective entireties at once.

In various embodiments, the step of combining bicine and oleylamine in the solvent is carried out in an inert or reducing environment. The inert or reducing environment typically includes an inert gas such as nitrogen gas, hydrogen gas, helium gas, argon gas, and combinations thereof. Most typically, the inert gas includes nitrogen gas.

The step of combining bicine and oleylamine in the solvent is typically carried out a temperature greater than ambient temperature. In particular, the temperature at which the bicine and oleylamine are combined in the solvent is typically from 120 to 160, more typically from 125 to 155, most typically from 130 to 150° C. In certain embodiments, depending upon the particular solvent utilized, this temperature at which the bicine and the oleylamine are combined in the solvent corresponds to the boiling point temperature of the solvent. For example, when the solvent includes xylene, the temperature at which the bicine and the oleylamine are combined in the xylene is typically about 140° C., or the boiling point temperature of the xylene. This temperature is maintained during the reaction between the bicine and the oleylamine, although it is to be appreciated that the temperature may vary within the range set forth above. In various non-limiting embodiments, all values and ranges of values including those set forth above and therebetween, are hereby expressly contemplated.

For illustrative purposes only, a reaction mechanism illustrating the reaction between bicine and oleylamine is set forth below:

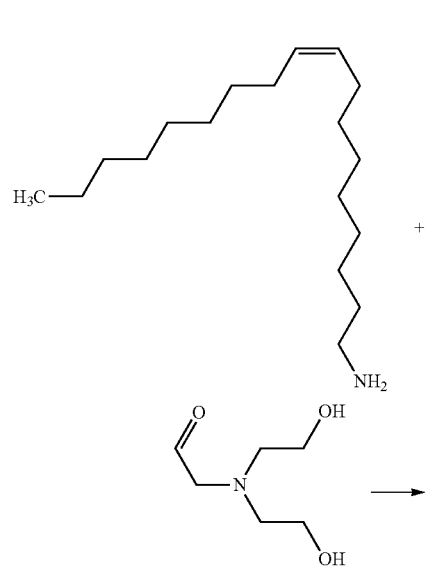

-continued

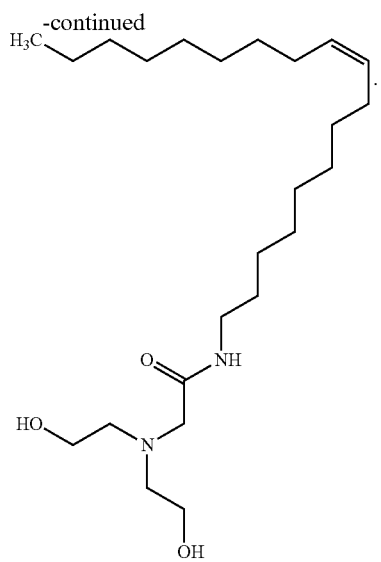

As the reaction between the bicine and the oleylamine progresses, water is generally produced as a by-product. To this end, water is typically collected during the reaction between the bicine and the oleylamine and removed. For example, water vapor may be collected, condensed, and discarded during the reaction, as readily understood by one of skill in the art. As the friction-reducing compound is formed from the reaction, a reaction mixture including the friction-reducing compound and any residual amounts of the bicine and the oleylamine typically has a yellow hue, whereas the bicine, oleylamine and the solvent is typically clear prior to the reaction between the bicine and the oleylamine.

In various embodiments, the bicine and oleylamine are reacted in the solvent for a period of time sufficient to obtain a conversion of at least 80%, typically at least 85%, more typically at least 90%, most typically at least 95%. As readily understood in the art, this conversion is relates to the molar amount of the bicine and the oleylamine reacted to produce the friction-reducing compound. It is to be understood that this period of time is contingent on many factors, including the particular solvent employed, the parameters at which the reaction is carried out (e.g. temperature), etc. As introduced above, water is a by-product of the reaction between bicine and oleylamine. Accordingly, when water is no longer being produced as a by-product, the bicine and oleylamine are no longer reacting. At this time, the reaction mixture including the friction-reducing compound and any residual amounts of the bicine and the oleylamine may be subjected to spectroscopy, e.g. gas chromatography, to determine whether any unreacted bicine and/or oleylamine remained in the reaction mixture. If unreacted bicine and oleylamine remained in the reaction mixture, the temperature at which the bicine and the oleylamine may be increased to further drive the reaction between the bicine and the oleylamine. For example, if the bicine and the oleylamine are combined in the solvent at 140° C., and unreacted bicine and oleylamine remain in the reaction mixture, the temperature of the reaction mixture may be increased to, for example, 150° C.

Once the desired conversion has been obtained, the second method typically further includes the step of isolating the friction-reducing compound from the reaction mixture. The step of isolating the friction-reducing compound from the reaction mixture typically includes stripping the reaction mixture under vacuum to remove the solvent and any residual oleylamine from the reaction mixture to form a concentrated reaction mixture. The step of isolating the friction-reducing compound typically further includes dissolving the concentrated reaction mixture in an organic solvent to form a solution and washing the solution with water to form an aqueous phase and an organic phase. The organic solvent may be any of the solvents set forth above with respect to the first or second solvents utilized in the first method or the solvent of the second method. In various embodiments, the organic solvent includes ethyl acetate. Any residual amount of the bicine is typically present in the aqueous phase, which is removed from the organic phase by, for example, decanting, or other methods of separating aqueous phases from organic phases known by those of skill in the art. The organic layer is typically further washed with a saturated sodium chloride solution, dried with a metal sulfate, such as magnesium sulfate, filtered, and concentrated to isolate the friction-reducing compound, which typically has the form of a yellow oil.

Lubricant Composition:

As introduced above, the subject disclosure also provides a lubricant composition. The lubricant composition includes the friction reducing compound and a base oil. The friction reducing compound is typically present in the lubricant composition in an amount of from greater than 0 to 2, more typically from greater than 0 to 1.5, most typically greater from 0.1 to 1, % by weight based on the total weight of the lubricant composition. In various non-limiting embodiments, all values and ranges of values including those set forth above and therebetween, are hereby expressly contemplated.

The base oil may alternatively be described as specified in the American Petroleum Institute (API) Base Oil Interchangeability Guidelines. In other words, the base oil may be further described as one or a combination of more than one of five base oil groups: Group I (sulphur content >0.03 wt %, and/or <90 wt % saturates, viscosity index 80-120); Group II (sulphur content less than or equal to 0.03 wt %, and greater than or equal to 90 wt % saturates, viscosity index 80-120); Group III (sulphur content less than or equal to 0.03 wt %, and greater than or equal to 90 wt % saturates, viscosity index less than or equal to 120); Group IV (all polyalphaolefins (PAO's)); and Group V (all others not included in Groups I, II, III, or IV). In one embodiment, the base oil is selected from the group consisting of API Group I, II, III, IV, V and combinations thereof. In one specific embodiment, the base oil includes API Group I compositions.

In another embodiment, the base oil is selected from the group consisting of API Group II, III, IV, and combinations thereof. In still another embodiment, the base oil is further defined as an API Group II, III, or IV oil and includes a maximum of 49.9 wt %, typically up to a maximum of 40 wt %, more typically up to a maximum of 30 wt %, even more typically up to a maximum of 20 wt %, even more typically up to a maximum of 10 wt % and even more typically up to a maximum of 5 wt % of the lubrication oil an API Group I or V oil. It is also contemplated that Group II and Group II basestocks prepared by hydrotreatment, hydrofinishing, hydroisomerzation or other hydrogenative upgrading processes may be included in the API Group II described above. Moreover, the base oil may include Fisher Tropsch or gas to liquid GTL oils. These are disclosed for example in U.S. Publication No. 2008/0076687, which is expressly incorporated herein by reference in its entirety in various non-limiting embodiments. In other non-limiting embodiments, all values and ranges of values including those set forth above and therebetween, are hereby expressly contemplated.

However, the base oil is not particularly limited and may be further defined as including one or more oils of lubrication viscosity such as natural and synthetic lubrication oils and mixtures thereof. In one embodiment, the base oil is further defined as a lubricant. The base oil may include at least one material selected from the group including API Group I base oil, API Group II base oil, API Group III base oil, API Group IV base oil, and API Group V base oil. In one specific embodiment, the base oil includes API Group II base oil.

The base oil may be further defined as a crankcase lubrication oil for spark-ignited and compression ignited internal combustion engines, including automobile and truck engines, two-cycle engines, aviation piston engines, and marine and railroad diesel engines. Alternatively, the base oil can be further defined as an oil to be used in gas engines, stationary power engines, and turbines. The base oil may be further defined as heavy or light duty engine oil. In one embodiment, the base oil is further defined as heavy duty diesel engine oil. Alternatively, the base oil may be described as an oil of lubricating viscosity or lubricating oil, for instance as disclosed in U.S. Pat. No. 6,787,663 and U.S. 2007/0197407, each of which is expressly incorporated herein by reference in its entirety in various non-limiting embodiments.

The base oil may be further defined as base stock oil. Alternatively, the base oil may be further defined as a component that is produced by a single manufacturer to the same specifications (independent of feed source or manufacturer's location) that meets the same manufacturer's specification and that is identified by a unique formula, product identification number, or both. The base oil may be manufactured or derived using a variety of different processes including but not limited to distillation, solvent refining, hydrogen processing, oligomerization, esterification, and re-refining. Re-refined stock is typically substantially free from materials introduced through manufacturing, contamination, or previous use. In one embodiment, the base oil is further defined as a base stock slate, as is known in the art.

Alternatively, the base oil may be derived from hydrocracking, hydrogenation, hydrofinishing, refined and re-refined oils or mixtures thereof or may include one or more such oils. In one embodiment, the base oil is further defined as an oil of lubricating viscosity such as natural or synthetic oil and/or combinations thereof. Natural oils include, but are not limited to, animal oils and vegetable oils (e.g., castor oil, lard oil) as well as liquid petroleum oils and solvent-treated or acid-treated mineral lubricating oils such as paraffinic, naphthenic or mixed paraffinic-naphthenic oils.

In various other embodiments, the base oil may be further defined as oil derived from coal or shale. Non-limiting examples of suitable oils include hydrocarbon oils such as polymerized and interpolymerized olefins (e.g., polybutylenes, polypropylenes, propylene-isobutylene copolymers, poly(1-hexenes), poly(1-octenes), poly(1-decenes), and mixtures thereof; alkylbenzenes (e.g., dodecylbenzenes, tetradecylbenzenes, dinonylbenzenes, and di(2-ethylhexyl)-benzenes); polyphenyls (e.g., biphenyls, terphenyls, and alkylated polyphenyls), alkylated diphenyl ethers and alkylated diphenyl sulfides and the derivatives, analogs, and homologs thereof.

In still other embodiments, the base oil may be further defined as synthetic oil which may include one or more alkylene oxide polymers and interpolymers and derivatives thereof wherein terminal hydroxyl groups are modified by esterification, etherification, or similar reactions. Typically, these synthetic oils are prepared through polymerization of ethylene oxide or propylene oxide to form polyoxyalkylene polymers which can be further reacted to form the oils. For example, alkyl and aryl ethers of these polyoxyalkylene polymers (e.g., methylpolyisopropylene glycol ether having an average molecular weight of 1,000; diphenyl ether of polyethylene glycol having a molecular weight of 500-1,000; and diethyl ether of polypropylene glycol having a molecular weight of 1,000-1,500) and/or mono- and polycarboxylic esters thereof (e.g. acetic acid esters, mixed C3-C8 fatty acid esters, or the C13 oxo acid diester of tetraethylene glycol) may also be utilized. In various non-limiting embodiments, all values and ranges of values including those set forth above and therebetween, are hereby expressly contemplated.

In even further embodiments, the base oil may include esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, and alkenyl malonic acids) with a variety of alcohols (e.g., butyl alcohol, hexyl alcohol, dodecyl alcohol, 2-ethylhexyl alcohol, ethylene glycol, diethylene glycol monoether, and propylene glycol). Specific examples of these esters include, but are not limited to, dibutyl adipate, di(2-ethylhexyl sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and combinations thereof. Esters useful as the base oil or as included in the base oil also include those formed from C5 to C12 monocarboxylic acids and polyols and polyol ethers such as neopentyl glycol, trimethylolpropane, pentaerythritol, dipentaerythritol, and tripentaerythritol.

The base oil may be alternatively described as refined oil, re-refined oil, unrefined oil or combinations thereof. Unrefined oils are typically obtained from a natural or synthetic source without further purification treatment. For example, a shale oil obtained directly from retorting operations, petroleum oil obtained directly from distillation, or ester oil obtained directly from an esterification process and used without further treatment, could all be utilized in this disclosure. Refined oils are similar to the unrefined oils except that they typically have undergone purification to improve one or more properties. Many such purification techniques are known to those of skill in the art such as solvent extraction, acid or base extraction, filtration, percolation, and similar purification techniques. Re-refined oils are also known as reclaimed or reprocessed oils and often are additionally processed by techniques directed to removal of spent additives and oil breakdown products.

The base oil is typically present in the lubricant composition in an amount of from 70 wt. % to 99.9 wt. %, from 80 wt. % to 99.9 wt. %, from 90 wt. % to 99.9 wt. %, from 75 wt. % to 95 wt. %, from 80 wt. % to 90 wt. %, or from 85 wt. % to 95 wt. %, by weight of the lubricant composition. Alternatively, the base oil may be present in the lubricant composition in amounts of greater than 70 wt. %, 75 wt. %, 80 wt. %, 85 wt. %, 90 wt. %, 91 wt. %, 92 wt. %, 93 wt. %, 94 wt. %, 95 wt. %, 96 wt. %, 97 wt. %, 98 wt. %, or 99 wt. %, parts by weight of the lubricant composition. In various embodiments, the amount of base oil in a fully formulated lubricant composition (including diluent or carrier oils presents) is from 80 to 99.5 percent by weight, for example, from 85 to 96 percent by weight, for instance from 90 to 95 percent by weight. Of course, the weight percent of the base oil may be any value or range of values, both whole and fractional, within those ranges and values described above and/or may vary from the values and/or range of values above by ±5%, ±10%, ±15%, ±20%, ±25%, ±30%, etc.

The lubricant composition described above may additionally include one or more additives to improve various chemical and/or physical properties of the lubricant composition. Specific examples of the one or more additives include, but are not limited to, anti-wear additives, metal passivators, rust inhibitors, viscosity index improvers, pour point depressors, dispersants, detergents, and antifriction additives. It is to be appreciated that the lubricant composition may be formulated with the additional of several auxiliary components to achieve certain performance objectives for use in certain applications. For example, the lubricant composition may be a rust and oxidation lubricant formulation, a hydraulic lubricant formulation, turbine lubricant oil, and an internal combustion engine lubricant formulation. Accordingly, it is contemplated that the base oil may be formulated to achieve these objectives as discussed below.

The anti-wear additive first introduced above is not particularly limited and may be any known in the art. In one embodiment, the anti-wear additive is selected from the group of ZDDP, zinc dialkyl-dithio phosphates, and combinations thereof. Alternatively, the anti-wear additive may include sulfur- and/or phosphorus- and/or halogen-containing compounds, e.g. sulfurised olefins and vegetable oils, zinc dialkyldithiophosphates, alkylated triphenyl phosphates, tritolyl phosphate, tricresyl phosphate, chlorinated paraffins, alkyl and aryl di- and trisulfides, amine salts of mono- and dialkyl phosphates, amine salts of methylphosphonic acid, diethanolaminomethyltolyltriazole, bis(2-ethylhexyl)aminomethyltolyltriazole, derivatives of 2,5-dimercapto-1,3,4-thiadiazole, ethyl 3-[(diisopropoxyphosphinothioyl)thio]propionate, triphenyl thiophosphate (triphenylphosphorothioate), tris(alkylphenyl) phosphorothioate and mixtures thereof (for example tris(isononylphenyl) phosphorothioate), diphenyl monononylphenyl phosphorothioate, isobutylphenyl diphenyl phosphorothioate, the dodecylamine salt of 3-hydroxy-1,3-thiaphosphetane 3-oxide, trithiophosphoric acid 5,5,5-tris [isooctyl 2-acetate], derivatives of 2-mercaptobenzothiazole such as 1-[N,N-bis (2-ethylhexyl)aminomethyl]-2-mercapto-1H-1,3-benzothiazole, ethoxycarbonyl-5-octyldithio carbamate, and/or combinations thereof.

The anti-wear additive is typically present in the lubricant composition in an amount of from 0.1 to 20, from 0.5 to 15, from 1 to 10, from 5 to 10, from 5 to 15, from 5 to 20, from 0.1 to 1, from 0.1 to 0.5, or from 0.1 to 1.5, parts by weight per 100 parts by weight of the lubricant composition. Alternatively, the anti-wear additive may be present in amounts of less than 20, less than 15, less than 10, less than 5, less than 1, less than 0.5, or less than 0.1, parts by weight per 100 parts by weight of the lubricant composition. Of course, the weight percent of the anti-wear additive may be any value or range of values, both whole and fractional, within those ranges and values described above and/or may vary from the values and/or range of values above by ±5%, ±10%, ±15%, ±20%, ±25%, ±30%, etc. based on the total weight of the lubricant composition.

In addition to the hydroxyl cinnaminic antioxidants described above, the lubricant composition may include other antioxidants. Suitable, non-limiting, antioxidants include alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl -6(1'-methylundec-1'-yl)phenol, 2,4-dimethyl-6-(1'-methylheptadec-1'-yl)phenol, 2,4-dimethyl-6-(1'-methyltridec-1'-yl)phenol, and combinations thereof.

Other non-limiting examples of suitable antioxidants includes alkylthiomethylphenols, for example 2,4-dioctyl-thiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and combinations thereof. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate, and combinations thereof, may also be utilized.

Furthermore, hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide, and combinations thereof, may also be used.

It is also contemplated that alkylidenebisphenols, for example 2,2'-methylenebis(6-tert-butyl-4-methylphenol), 2,2'-methylenebis(6-tert-butyl-4-ethylphenol), 2,2'-methylenebis [4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butyl phenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis [6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis (5-tert-butyl-4-hydroxy-2-methyl-phenyl)-3-n-dodecylmercaptobutane, ethylene glycol bis [3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methyl phenyl)pentane, and combinations thereof may be utilized as antioxidants in the lubricant composition.

O—, N— and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tris-(3,5-di-tert-butyl-4-hydroxybenzyl)amine, bis(4-tert-butyl-3-hydroxy-2,6-dimethylbenzyl)dithiol terephthalate, bis(3,5- di-tert-butyl-4-hydroxybenzyl)sulfide, isooctyl-3,5di-tert-butyl-4-hydroxy benzylmercaptoacetate, and combinations thereof, may also be utilized.

Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4 -hydroxybenzyl)malonate, bis [4-(1,1,3,3-tetramethylbutyl]phenyl]-2,2-bis(3,5-di-tert-butyl-4-hydroxybenzyl) malonate, and combinations thereof are also suitable for use as antioxidants.

Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1, 3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl 2,4,6-tris (3,5-di-tert-butyl-4-hydroxyphenylethyl)-1,3,5-triazine, 1,3,5-tris(3,5-di-tert-butyl-4-hydroxyphenyl propionyl)-hexahydro-1,3,5-triazine, 1,3,5-tris(3,5-dicyclohexyl-4hydroxybenzyl) isocyanurate, and combinations thereof, may also be used.

Additional suitable, but non-limiting examples of antioxidants include aromatic hydroxybenzyl compounds, for example 1,3,5-tris-(3,5-di-tert-butyl-4-hydroxybenzyl)-2,4, 6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, and combinations thereof. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid, and combinations thereof, may also be utilized. In addition, acylaminophenols, for example 4-hydroxylauranilide, 4-hydroxystearanilide, octyl N-(3,5-di-tert-butyl-4-hydroxyphenyl)carbamate.

Esters of [3-(3,5-di-tert-butyl-4-hydroxyphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and combinations thereof, may also be used. It is further contemplated that esters of β-(5-tert-butyl-4-hydroxy-3-methylphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and combinations thereof, may be used. Esters of 13-(3,5-dicyclohexyl-4-hydroxyphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane, and combinations thereof, may also be used. Moreover, esters of 3,5-di-tert-butyl-4-hydroxyphenyl acetic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3 -thiapentadecanol, trimethylhexanediol, trimethylolpropane, 4-hydroxymethyl-1-phospha-2,6,7-trioxabicyclo[2.2.2]octane, and combinations thereof, may be utilized.

Additional non-limiting examples of suitable antioxidants include those that include nitrogen, such as amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)phydrazine. Other suitable non-limiting examples of antioxidant include aminic antioxidants such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3 -dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino methylphenol, 2,4'-diaminodiphenylmethane, 4,4'-diaminodiphenylmethane, N,N,N', N'-tetramethyl -4,4'-diaminodiphenylmethane, 1,2-bis[(2-methyl-phenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated isopropyl/isohexyldiphenylamines, mixtures of mono- and dialkylated tert-butyldiphenylamines, 2,3-dihydro-3,3-dimethyl-4H-1, 4-benzothiazine, phenothiazine, N-allylphenothiazine, N,N, N',N'-tetraphenyl-1,4-diaminobut-2-ene, N,N-bis(2,2,6,6-tetramethylpiperid-4-yl -hexamethylenediamine, bis(2,2,6, 6-tetramethyl piperid-4-yl)sebacate, 2,2,6,6-tetramethylpiperidin-4-one and 2,2,6,6-tetramethylpiperidin-4-ol, and combinations thereof.

Even further non-limiting examples of suitable antioxidants includes aliphatic or aromatic phosphites, esters of thiodipropionic acid or of thiodiacetic acid, or salts of dithiocarbamic or dithiophosphoric acid, 2,2,12,12 -tetramethyl-5, 9-dihydroxy-3,7,1trithiatridecane and 2,2,15,15-tetramethyl-5,12-dihydroxy-3,7,10,14-tetrathiahexadecane, and combinations thereof. Furthermore, sulfurized fatty esters, sulfurized fats and sulfurized olefins, and combinations thereof, may be used.

In various embodiments, one or more metal deactivators can be included in the lubricant composition. Suitable, non-limiting examples of the one or more metal deactivators include benzotriazoles and derivatives thereof, for example 4- or 5-alkylbenzotriazoles (e.g. tolutriazole) and derivatives thereof, 4,5,6,7-tetrahydrobenzotriazole and 5,5'-methylenebisbenzotriazole; Mannich bases of benzotriazole or tolutriazole, e.g. 1-[bis(2-ethylhexyl)aminomethyl)tolutriazole and 1-[bis(2-ethylhexyl)aminomethyl)benzotriazole; and alkoxyalkylbenzotriazoles such as 1-(nonyloxymethyl)benzotriazole, 1-(1-butoxyethyl)benzotriazole and 1-(1-cyclohexyloxybutyl) tolutriazole, and combinations thereof.

Additional non-limiting examples of the one or more metal deactivators include 1,2,4-triazoles and derivatives thereof, for example 3-alkyl(or aryl)-1,2,4-triazoles, and Mannich bases of 1,2,4-triazoles, such as 1-[bis(2-ethylhexyl)aminomethyl-1,2,4-triazole; alkoxyalkyl-1,2,4-triazoles such as 1-(1-butoxyethyl)-1,2,4-triazole; and acylated 3-amino-1,2,4-triazoles, imidazole derivatives, for example 4,4'-methylenebis(2-undecyl-5-methylimidazole) and bis [(N-methyl)imidazol-2-yl]carbinol octyl ether, and combinations thereof.

Further non-limiting examples of the one or more metal deactivators include sulfur-containing heterocyclic compounds, for example 2-mercaptobenzothiazole, 2,5-dimercapto-1,3,4-thiadiazole and derivatives thereof and 3,5-bis[di(2-ethylhexyl)aminomethyl]-1,3,4-thiadiazolin-2-one, and combinations thereof. Even further non-limiting examples of the one or more metal deactivators include amino compounds, for example salicylidenepropylenediamine, salicylaminoguanidine and salts thereof, and combinations thereof.

The one or more metal deactivators are not particularly limited in amount in the lubricant composition but are typically present in an amount of from 0.01 wt. % to 0.1 wt. %, from 0.05 wt. % to 0.01 wt. %, or from 0.07 wt. % to 0.1 wt. %, parts by weight per 100 parts by weight of the lubricant composition. Alternatively, the one or more metal deactivators may be present in amounts of less than 0.1 wt. %, of less than 0.7 wt. %, or less than 0.5 wt. %, by weight of the lubricant composition. The weight percent of the one or more metal deactivators may be any value or range of values, both whole and fractional, within those ranges and values described above and/or may be present in amounts that vary from the values and/or range of values above by ±5%, ±10%, ±15%, ±20%, ±25%, ±30%, etc.

In various embodiments, one or more rust inhibitors and/or friction modifiers can be included in the lubricant composition. Suitable, non-limiting examples of the one or more rust inhibitors and/or friction modifiers include organic acids, their esters, metal salts, amine salts and anhydrides, for example alkyl- and alkenylsuccinic acids and their partial esters with alcohols, diols or hydroxycarboxylic acids, partial amides of alkyl- and alkenylsuccinic acids, 4-nonylphenoxyacetic acid, alkoxy- and alkoxyethoxycarboxylic acids such as dodecyloxyacetic acid, dodecyloxy (ethoxy)acetic acid and the amine salts thereof, and also N-oleoylsarcosine, sorbitan monooleate, lead naphthenate, alkenylsuccinic anhydrides, for example dodecenylsuccinic anhydride, 2-carboxymethyl-1-dodecyl-3-methylglycerol and the amine salts thereof, and combinations thereof. Additional suitable, non-limiting examples of the one or more rust inhibitors and/or friction modifiers include nitrogen-containing compounds, for example, primary, secondary or tertiary aliphatic or cycloaliphatic amines and amine salts of organic and inorganic acids, for example oil-soluble alkylammonium carboxylates, and also 1-[N,N-bis(2-hydroxyethyl)amino]-3-(4-nonylphenoxy)propan-2-ol, and combinations thereof. Further suitable, non-limiting examples of the one or more rust inhibitors and/or friction modifiers include heterocyclic compounds, for example: substituted imidazolines and oxazolines, and 2-heptadecenyl-1-(2-hydroxyethyl)imidazoline, phosphorus-containing compounds, for example: Amine salts of phosphoric acid partial esters or phosphonic acid partial esters, and zinc dialkyldithiophosphates, molybdenum- containing compounds, such as molydbenum dithiocarbamate and other sulphur and phosphorus containing derivatives, sulfur-containing compounds, for example: barium dinonylnaphthalenesulfonates, calcium petroleum sulfonates, alkylthio-substituted aliphatic carboxylic acids, esters of aliphatic 2-sulfocarboxylic acids and salts thereof, glycerol derivatives, for example: glycerol monooleate, 1-(alkylphenoxy)-3-(2-hydroxyethyl)glycerols, 1-(alkylphenoxy)-3 -(2,3 -di hydroxypropyl) glycerols and 2-carboxyalkyl-1,3-dialkylglycerols, and combinations thereof.

The one or more rust inhibitors and friction modifiers are not particularly limited in amount in the lubricant composition but are typically present in an amount of from 0.05 wt. % to 0.5 wt. %, 0.01 wt. % to 0.2 wt. %, from 0.05 wt. % to 0.2 wt. %, 0.1 wt. % to 0.2 wt. %, 0.15 wt. % to 0.2 wt. %, or 0.02 wt. % to 0.2 wt. %, by weight of the lubricant composition. Alternatively, the one or more rust inhibitors and friction modifiers may be present in amounts of less than 0.5 wt. %, less than 0.4 wt. %, less than 0.3 wt. %, less than 0.2 wt. %, less than 0.1 wt. %, less than 0.5 wt. %, or less than 0.1 wt. %, by weight of the lubricant composition. The weight percent of the one or more rust inhibitors and friction modifiers may be any value or range of values, both whole and fractional, within those ranges and values described above and/or may be present in amounts that vary from the values and/or range of values above by ±5%, ±10%, ±15%, ±20%, ±25%, ±30%, etc.

In various embodiments, one or more viscosity index improvers can be included in the lubricant composition. Suitable, non-limiting examples of the one or more viscosity index improvers include polyacrylates, polymethacrylates, vinylpyrrolidone/methacrylate copolymers, polyvinylpyrrolidones, polybutenes, olefin copolymers, styrene/acrylate copolymers and polyethers, and combinations thereof.

The one or more viscosity index improvers are not particularly limited in amount in the lubricant composition but are typically present in an amount of from 2 wt. % to 8 wt. %, from 3 wt. % to 7 wt. %, from 4 wt. % to 6 wt. %, or from 4 wt. % to 5 wt. %, by weight of the lubricant composition. Alternatively, the one or more viscosity index improvers may be present in an amount of less than 10 wt. %, 9 wt. %, 8 wt. % , 7 wt. %, 6 wt. %, 5 wt. %, 4 wt. %, 3 wt. %, 2 wt. %, or 1 wt. %, by weight of the lubricant composition. The weight percent of the one or more viscosity index improvers may be any value or range of values, both whole and fractional, within those ranges and values described above and/or may be present in amounts that vary from the values and/or range of values above by ±5%, ±10%, ±15%, ±20%, ±25%, ±30%, etc.

In various embodiments, one or more pour point depressants can be included in the lubricant composition. Suitable, non-limiting examples of the pour point depressants include polymethacrylate and alkylated naphthalene derivatives, and combinations thereof.

The one or more pour point depressants are not particularly limited in amount in the lubricant composition but are typically present in an amount of from 0.1 wt. % to 1 wt. %, from 0.5 wt. % to 1 wt. %, or from 0.7 wt. % to 1 wt. %, by weight of the lubricant composition. Alternatively, the one or more pour point depressants may be present in amounts of less than 1 wt. %, less than 0.7 wt. %, or less than 0.5 wt. %, by weight of the lubricant composition. The weight percent of the one or more pour point depressants may be any value or range of values, both whole and fractional, within those ranges and values described above and/or may be present in amounts that vary from the values and/or range of values above by ±5%, ±10%, ±15%, ±20%, ±25%, ±30%, etc.

In various embodiments, one or more dispersants can be included in the lubricant composition. Suitable, non-limiting examples of the one or more dispersants include polybutenylsuccinic amides or -imides, polybutenylphosphonic acid derivatives and basic magnesium, calcium and barium sulfonates and phenolates, succinate esters and alkylphenol amines (Mannich bases), and combinations thereof.

The one or more dispersants are not particularly limited in amount in the lubricant composition but are typically present in an amount of from 0.1 wt. % to 5 wt. %, from 0.5 wt. % to 4.5 wt. %, from 1 wt. % to 4 wt. %, from 1.5 wt. % to 3.5 wt. %, from 2 wt. % to 3 wt. %, or from 2.5 wt. % to 3 wt. %, by weight of the lubricant composition. Alternatively, the one or more dispersants may be present in an amount of less than 5 wt. %, 4.5 wt. %, 3.5 wt. %, 3 wt. %, 2.5 wt. %, 2 wt. %, 1.5 wt. %, or 1 wt. %, by weight of the lubricant composition. The weight percent of the one or more dispersants may be any value or range of values, both whole and fractional, within those ranges and values described above and/or may be present in amounts that vary from the values and/or range of values above by ±5%, ±10%, ±15%, ±20%, ±25%, ±30%, etc.

In various embodiments, one or more detergents can be included in the lubricant composition. Suitable, non-limiting examples of the one or more detergents include overbased or neutral metal sulphonates, phenates and salicylates, and combinations thereof.

The one or more detergents are not particularly limited in amount in the lubricant composition but are typically present in an amount of from 0.1 wt. % to 5 wt. %, from 0.5 wt. % to 4.5 wt. %, from 1 wt. % to 4 wt. %, from 1.5 wt. % to 3.5 wt. %, from 2 wt. % to 3 wt. %, or from 2.5 wt. % to 3 wt. %, by weight of the lubricant composition. Alternatively, the one or more detergents may be present in an amount of less than 5 wt. %, 4.5 wt. %, 3.5 wt. %, 3 wt. %, 2.5 wt. %, 2 wt. %, 1.5 wt. %, or 1 wt. %, by weight of the lubricant composition. The weight percent of the one or more detergents may be any value or range of values, both whole and fractional, within those ranges and values described above and/or may be present in amounts that vary from the values and/or range of values above by ±5%, ±10%, ±15%, ±20%, ±25%, ±30%, etc.

In various embodiments, the lubricant composition is substantially free of water, e.g. the lubricant composition includes less than 5 wt. %, 4 wt. %, 3 wt. %, 2 wt. %, or 1 wt. %, of water. Alternatively, the lubricant composition may include less than 0.5 wt. % or 0.1 wt. % of water or may be free of water. Of course, the weight percent of the water may be any value or range of values, both whole and fractional, within those ranges and values described above and/or may be present in amounts that vary from the values and/or range of values above by ±5%, ±10%, ±15%, ±20%, ±25%, ±30%, etc.

The lubricant composition has excellent physical properties, particularly friction-reducing properties. Accordingly, when the lubricant composition is utilized in an internal combustion engine of a vehicle, fuel economy of the vehicle is improved relative to vehicles including conventional lubricant compositions.

The following examples are intended to illustrate the disclosure and are not to be viewed in any way as limiting to the scope of the disclosure.

EXAMPLES

Preparation Example 1

300 grams of bicine (1.84 mol) and 100 mL of xylene were disposed in a 3-neck round-bottom flask fitted with a Dean-Stark receiver and condenser. 1.86 mol of oleylamine is disposed in the flask. The contents of the flask are stirred under nitrogen, to reflux, at 140 ° C. Water is collected in the Dean-Stark receiver and is continuously stripped off into a graduated cylinder. As the reaction between the bicine and the oleylamine progresses, the contents of the flask begin to have a yellow hue. Once water is no longer collected in the Dean-Stark receiver, the contents of the flask are subjected to gas chromatography to determine whether any unreacted bicine and/or oleylamine remain in the flask. The Dean-Stark receiver is replaced with a short-path distillation head to strip away xylene and excess oleylamine from the flask under vacuum. The contents of the flask (after xylene and oleylamine removal) are dissolved in ethyl acetate and washed with 100 mL of water under bicine is removed (as determined by gas chromatography). An organic layer formed from the ethyl acetate is washed with 100 mL of a brine solution (saturated sodium chloride), dried with magnesium sulfate, filtered, and concentrated. A friction-reducing compound is obtained, with greater than 90% conversion, which is a yellow oil.

Preparation Example 2

266.1 grams of oleylamine, 110 grams of $Na_2CO_3$, 500 mL of diethyl ether, and 1 L of water are disposed in a 3L 3-necked Morton flask fitted with a mechanical stirrer and a thermocouple thermometer. The contents of the flask are stirred vigorously and cooled to about 15° C. via an ice bath. 121.38 grams of acetyl chloride is added to the flask dropwise over about an hour. The contents of the flask are stirred for an additional hour at a temperature between 15 and 20° C. An additional 500 mL of diethyl ether and an additional 500 mL of water are disposed in the flask to form an aqueous phase and an organic phase. The aqueous phase is removed from the flask. The organic phase is washed with 400 mL water, then 400 mL of a brine solution (saturated sodium chloride). The organic phase is then dried over $Na_2SO_4$ and subjected to a rotary evaporator to remove the diethyl ether. 335.7 grams of 2-chloro-N-oleylacetamide is obtained. The 2-chloro-N-oleylacetamide is reacted with diethanolamine in isopropyl alcohol with 1 mol equivalent of $Na_2CO_3$ for about 12 hours to form the friction-reducing compound.

Fully Formulated Lubricant

A fully formulated passenger car Group II motor oil containing 0.7 weight percent of the friction modifying additive (2-bis(2-hydroxyethyl)amino-N-oleylacetamide) formed above is compared with a fully formulated motor oil further containing 0.7 weight percent Group II oil. The formulated Group II oil contains 3.2 percent detergent, 0.005 percent antifoam additive, 1.7 percent dispersant, 1.0 percent zinc dialkyldithiophosphate, 0.8 percent of another hindered phenolic antioxidant, 0.8 percent of an aminic antioxidant, 3.0 percent of a Group I oil, 5.5 percent of an olefin copolymer viscosity index improver and 0.1 percent of a pour point depressant.

A friction test is performed with a mini traction machine (PCS Instruments). The test is chosen to mimic the ILSAC VI D test. A similar test is performed in U.S. 2006/0189490, which is expressly incorporated by reference relative to this test. A rolling-sliding lubricated contact is formed between a steel ball and the flat surface of a steel disc. The disc is immersed in lubricant and the temperature of the lubricant and the contact are controlled.

The conditions are a smooth ball with a radius of 0.9525 cm, a Young's modulus of 207 GPa and a surface average roughness of 0.005 μm contacting a flat disk with the same modulus but with roughness of 0.15 μm under 10 N of contact load (thereby producing a contact pressure of 651 MPa at 115° C.). Cam-follower contacts are estimated to produce contact pressures in the hundreds to low thousands of MPa, ring-liner contacts have contact pressures of only dozens of MPa. A slide-to-roll ratio of 100 is employed. After reaching the test temperature of 115° C. and a five minute run-in period at 10 N load and 1000 mm/s mean speed at the test slide-to-roll ratio, Stribeck curves are acquired over the entire speed range, with five-minute run-in periods in between each curve acquisition. The acquisition is repeated 20 times.

Figure 2:
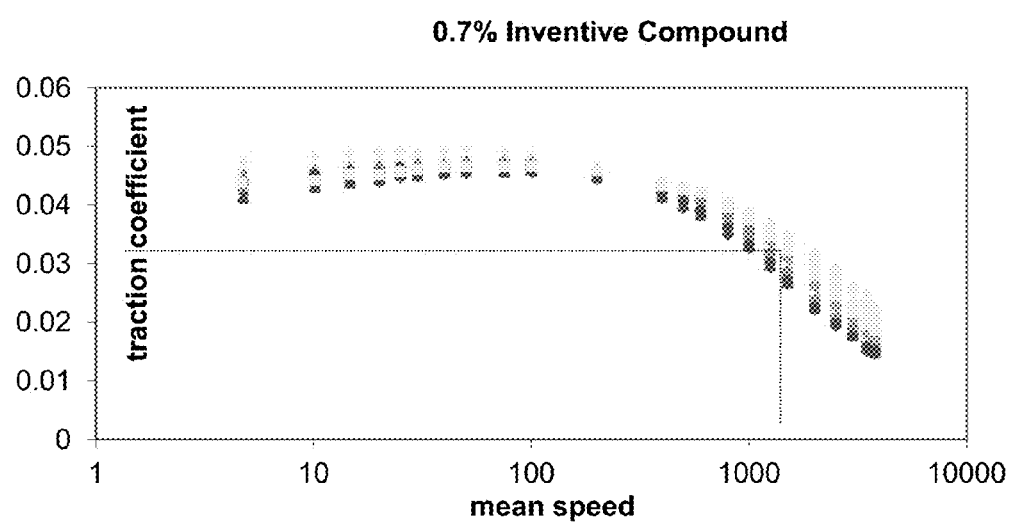
FIG. 2 is a graph that shows traction coefficient as a function of mean speed, as evaluated in the inventive Examples.

The 2-[bis(2-hydroxyethyl)amino-N-oleylacetamide-treated oil produces a significant decrease in the amount of friction observed compared to the control oil tested by allowing the transition from boundary to hydrodynamic lubrication at slower speeds, in addition to reducing the maximum friction coefficient attained at low speeds. The results are set forth in FIGS. 1 and 2.

Some of the compounds described above may interact in the lubricant composition, so the components of the lubricant composition in final form may be different from those components that are initially added or combined together. Some products formed thereby, including products formed upon employing the lubricant composition of this disclosure in its intended use, are not easily described or describable. Nevertheless, all such modifications, reaction products, and products formed upon employing the lubricant composition of this disclosure in its intended use, are expressly contemplated and hereby included herein. Various embodiments of this disclosure include one or more of the modification, reaction products, and products formed from employing the lubricant composition, as described above.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A friction-reducing compound for a lubricant composition, said friction reducing compound having the following general formula:

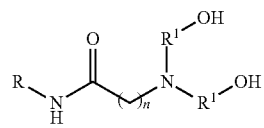

wherein R is an alkyl or alkenyl group having 8 or more carbon atoms, each $R^1$ is an independently selected hydrocarbon group having 2 to 10 carbon atoms, and n is 1.

2. A friction-reducing compound as set forth in claim 1 wherein one $R^1$ is $CH_2CH_2$ and the other $R^1$ is different.

3. A friction-reducing compound as set forth in claim 1 wherein each $R^1$ is $CH_2CH_2$.

4. A friction-reducing compound as set forth in claim 1 wherein one $R^1$ is $CH(R^2)CH_2$, wherein $R^2$ is a hydrocarbon group having 1 to 8 carbon atoms, and wherein the other $R^1$ is different.

5. A friction-reducing compound as set forth in claim 4 wherein $R^2$ is an alkyl group having 1 to 4 carbon atoms.

6. A friction-reducing compound as set forth in claim 1 wherein each $R^1$ is independently $CH(R^2)CH_2$ and wherein each $R^2$ is independently a hydrocarbon group having 1 to 8 carbon atoms.

7. A friction-reducing compound as set forth in claim 6 wherein each $R^2$ is independently an alkyl group having 1 to 4 carbon atoms.

8. A friction-reducing compound as set forth in claim 1 wherein R is an alkyl or alkenyl group having 8 to 22 carbon atoms.

9. A friction-reducing compound as set forth in claim 1 wherein R is an oleyl group.

10. A friction-reducing compound as set forth in claim 1 wherein R has zero carbon-carbon double bonds.

11. A friction-reducing compound as set forth in claim 1 wherein R has 1 carbon-carbon double bond.

12. A lubricant composition for improving fuel economy of a vehicle having an internal combustion engine, said lubricant composition comprising:
   a base oil; and
   a friction reducing compound having the following general formula:

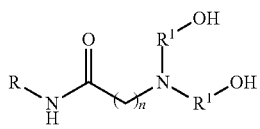

wherein R is an alkyl or alkenyl group having 8 or more carbon atoms, each $R^1$ is an independently selected hydrocarbon group having 2 to 10 carbon atoms, and n is 1.

13. A lubricant composition as set forth in claim 12 wherein said base oil is an API Group II base oil.

14. A lubricant composition as set forth in claim 12 wherein said friction reducing compound is present in an amount of from greater than 0 and up to 2% by weight based on the total weight of said lubricant composition.

15. A lubricant composition as set forth in claim 12 wherein said friction reducing compound is present in an amount of from 0.1 to 1% by weight based on the total weight of said lubricant composition.

16. A lubricant composition as set forth in claim 12 further comprising an antioxidant.

17. A method of producing a friction-reducing compound for a lubricant composition, said method comprising the steps of:
   combining bicine and an amine in a solvent to produce the friction-reducing compound having the following general formula:

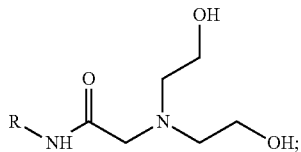

and
   wherein R is an alkyl or alkenyl group having 8 or more carbon atoms.

18. A method as set forth in claim 17 wherein the amine is oleylamine and the step of combining bicine and oleylamine comprises combining bicine and oleylamine in a molar ratio of from 0.9:1 to 1.1:1.

19. A method as set forth in claim 17 wherein the amine is oleylamine and the step of combining bicine and oleylamine comprises combining bicine and oleylamine under nitrogen at a temperature of from 130 to 150° C.

20. A method as set forth in claim 17 having a conversion of at least 90%.

* * * * *